(12) United States Patent
Rispoli et al.

(10) Patent No.: US 8,969,647 B2
(45) Date of Patent: Mar. 3, 2015

(54) PROCESS AND APPARATUS FOR THE THERMAL TREATMENT OF REFINERY SLUDGE

(75) Inventors: Giacomo Fernando Rispoli, Rome (IT); Felicia Massetti, Capalbio Scalo (IT); Michelangelo D'Abbieri, Rome (IT); Medardo Pinti, Rome (IT); Maria Ilaria Pistelli, Tarquinia (IT)

(73) Assignee: ENI S.p.A., Rome (IT)

( * ) Notice: Subject to any disclaimer, the term of this patent is extended or adjusted under 35 U.S.C. 154(b) by 301 days.

(21) Appl. No.: 13/384,436

(22) PCT Filed: Jul. 7, 2010

(86) PCT No.: PCT/IB2010/001688
§ 371 (c)(1),
(2), (4) Date: Mar. 12, 2012

(87) PCT Pub. No.: WO2011/007231
PCT Pub. Date: Jan. 20, 2011

(65) Prior Publication Data
US 2012/0184797 A1    Jul. 19, 2012

(30) Foreign Application Priority Data
Jul. 17, 2009 (IT) .............................. MI2009A1276

(51) Int. Cl.
| | | |
|---|---|---|
| A62D 3/20 | (2007.01) |
| C01B 3/36 | (2006.01) |
| B01J 7/00 | (2006.01) |
| C10J 3/10 | (2006.01) |
| C10J 3/00 | (2006.01) |
| C10J 3/14 | (2006.01) |
| C10J 3/20 | (2006.01) |
| C10J 3/80 | (2006.01) |

(52) U.S. Cl.
CPC .. *C10J 3/10* (2013.01); *C10J 3/005* (2013.01); *C10J 3/14* (2013.01); *C10J 3/20* (2013.01); *C10J 3/80* (2013.01); *C10J 2300/0909* (2013.01); *C10J 2300/0926* (2013.01); *C10J2300/0989* (2013.01); *C10J 2300/1606* (2013.01)
USPC ............ 588/312; 252/373; 422/643; 588/405

(58) Field of Classification Search
USPC ........ 588/312, 405; 252/373; 34/61; 422/643
See application file for complete search history.

(56) References Cited

U.S. PATENT DOCUMENTS

| | | |
|---|---|---|
| 5,319,176 A | 6/1994 | Alvi et al. |
| 5,389,234 A | 2/1995 | Bhargava et al. |

(Continued)

FOREIGN PATENT DOCUMENTS

EP    0 348 707    1/1990

OTHER PUBLICATIONS

International Search Report Issued May 23, 2011 in PCT/IB10/01688 Filed Jul. 7, 2010.

*Primary Examiner* — Wayne Langel
(74) *Attorney, Agent, or Firm* — Oblon, McClelland, Maier & Neustadt, L.L.P.

(57) ABSTRACT

A continuous process for the thermal treatment of a refinery sludge, comprising the following operations: a. drying of the refinery sludge, possibly mixed with pet-coke, at a temperature ranging from 110 to 120° C.; b. gasification of the dried sludge, at a temperature ranging from 750 to 950° C., for a time of 30 to 60 minutes, in the presence of a gas containing oxygen and water vapour, with the associated production of synthesis gas ($CO+H_2$) and a solid residue; c. combustion of the synthesis gas at a temperature ranging from 850 to 1,200° C. and recycling of the combustion products for the drying and gasification phases; and d. inertization of the solid residue, at a temperature ranging from 1,300 to 1,500° C., by vitrification with plasma torches.

13 Claims, 2 Drawing Sheets

(56) References Cited

U.S. PATENT DOCUMENTS

| | | |
|---|---|---|
| 5,451,738 A | 9/1995 | Alvi et al. |
| 5,851,246 A | 12/1998 | Bishop et al. |
| 6,063,355 A * | 5/2000 | Fujimura et al. .............. 423/359 |
| 2007/0095046 A1 * | 5/2007 | Wallace ....................... 60/39.12 |
| 2007/0258869 A1 | 11/2007 | Tsangaris et al. |
| 2008/0209807 A1 | 9/2008 | Tsangaris et al. |
| 2008/0210089 A1 | 9/2008 | Tsangaris et al. |
| 2009/0118561 A1 * | 5/2009 | Vera .............................. 588/311 |
| 2010/0275781 A1 | 11/2010 | Tsangaris et al. |

* cited by examiner

PROCESS AND APPARATUS FOR THE THERMAL TREATMENT OF REFINERY SLUDGE

The present invention relates to the field of the disposal of refinery sludge.

More specifically, the present invention relates to a process for the thermal treatment of refinery sludge such as oil sludge, sludge deriving from the treatment of wastewater and biological sludge, hereafter defined as oil sludge or simply sludge.

Sludge is produced by various unitary operations. Oil sludge, for example, is produced by the treatment of wastewater (API separator, drainages from the flotation section), the draining of storage tanks of crude oil and various kinds of heavy hydrocarbon products such as gas oil, fuel oil, slop-type sediments, etc., said latter oil residues are called tank dregs.

The volumes of the sludge material generated are linked to the type of crude oils treated, the used treatment technologies and the applied maintenance strategies for the plants and tanks.

Oil sludge generally comprises water, oil and solids and its currently most widely-used final destination is disposal in dumps.

At present, the critical aspects connected with disposal in dumps, in addition to that relating to the saturation of the same dumps, are mainly linked to the changes in the legislation conditions, which, in particular, no longer allow residual treatment slag with a high LCP (Lower Calorific Power) to be disposed in dumps.

Biological treatment has been proposed for the disposal of sludge, which however has problems relating to long process times, in the order of days, and which is effected in complex and non-compact plants, not compatible with the quantity of material to be treated, ever increasing, due to the increasing number of industrial purification plants.

For the disposal of sludge, systems have also been proposed using solvents for extracting the oil fraction and recovering it either directly as slop or after a distillation operation.

Finally, gasification systems or sludge combustion systems are known, for example from the Chinese patent CN 1,689,962, which use fixed bed, bubbling or rotating ovens (rotating reactor). Due to the physico-chemical characteristics of the sludge, these systems have various critical points related to their handling (feeding, moving, storage) as a result of the dangerousness of their emissions and, along the process line, due to the rheological characteristics of the solid product which, as being modified along the heating/drying path, produce particular adhesion conditions to the walls and/or to the movement systems of the material and therefore discontinuity of treatment both in the feeding and advancing of the material in the reactor.

The need is therefore felt, in the specific field, of availing of a simple and economical process for the treatment of refinery sludge and apparatus for its implementation.

The present invention significantly contributes to the solution of the problem of sludge treatment, providing an alternative solution at least to disposal in dumps.

The process and apparatus for its embodiment, object of the present invention and described in the enclosed claims, include the presence of four operative sections, each of which exerts a specific process phase: drying, gasification, combustion, inertization.

The invention proposed allows to obtain a reduction in the solid volumes greater than 80% and enables the production of inert products from the remaining part of solid waste.

The embodiment of the present invention also allows, in addition to a reduction in the solid volumes, a production of gaseous volumes (syngas) capable of thermically self-sustaining the volume reduction process. When the process is in regime, in fact, no contribution from other heating sources is necessary for sustaining the process, and this thanks to the particular characteristics of the gasification system used which, by the use of differentiated injections, allows a higher efficiency of the process to be obtained (in terms of rate and overall gaseous conversion yield) and a lower heat dispersion.

An object of the present invention therefore relates to a continuous process for the thermal treatment of refinery sludge, comprising the following operations:

a. drying of the refinery sludge, possibly mixed with pet-coke (petroleum coke), at a temperature ranging from 110 to 120° C.;
b. gasification of the dried sludge, at a temperature ranging from 750 to 950° C., for a time of 30 to 60 minutes, in the presence of a gas containing oxygen and water vapour, fed with the incremental differentiated modality, with the associated production of synthesis gas ($CO+H_2$) and a solid residue;
c. combustion of the synthesis gas at a temperature ranging from 850 to 1,200° C. and recycling of the combustion products for the drying and gasification phases; and
d. inertization of the solid residue, at a temperature ranging from 1,300 to 1,500° C., by vitrification with plasma torches.

The overall process proposed is effected at a pressure ranging from 100 to 300 Pa.

According to an embodiment of the process object of the present invention, pet-coke is added to the sludge preferably in a quantity of up to 25% by weight with respect to the total. The pet-coke/sludge mixture thus obtained is dried, (or pre-heated in the absence of water), in order to eliminate the water possibly present. The drying or pre-heating times normally range from 30 to 60 minutes. The water vapour possibly produced during the drying can be kept in the cycle and further sent to steps (b) and (c).

After the drying phase, the hot sludge passes through a gasification section, where the organic component, essentially consisting of heavy oils, residues of biological sludge and possibly pet-coke is transformed to a gas comprising CO and hydrogen.

More specifically, the hot sludge is mixed with a gas containing oxygen and vapour, also pre-heated and maintained in close contact for times of 30 to 60 minutes. During this period, the organic components are oxidized, whereas the carbonaceous residues reduce the water vapour finally producing a gas (synthesis gas) essentially consisting of CO and $H_2$. The reaction takes place in an elongated chamber maintained at the selected temperature by the gases coming from the combustion step (step c). The gas containing oxygen can consist of substantially pure oxygen, air or air enriched with oxygen, for example up to 50% by volume.

For a better gasification phase of the sludge, the gas containing oxygen and the water vapour are preferably fed in the relative section with a differentiated and incremental modality, from the inlet towards the outlet of the same section.

The synthesis gas passes to the combustion section, after filtration, where it is burnt and the hot combustion products (fumes) are then recycled to the sections of steps (a) and (b). After possible further filtration of the entrained solid particles, the combustion fumes are subsequently discharged into the environment.

The residual solid is discharged in continuous in an inertization section where it is vitrified by means of a plasma torch.

The vitrification phase is carried out for times generally ranging from 30 to 60 minutes, using a torch having nominal power, for example ranging from 100 to 150 kW.

The present invention includes also a suitable apparatus for effecting the process according to the invention, said apparatus as being better described in the enclosed claims.

A further object of the present invention also relates to a suitable apparatus for effecting the process described above, for the thermal treatment of refinery sludge, comprising the following parts:

i. a first chamber, a drying chamber, rotating around its longitudinal axis tilted with respect to the horizontal, indirectly heated internally by means of at least one radiating tube inside which the fumes coming from a combustion chamber flow, said radiating tube being such as to contain at least a further coaxial tube in which a mixture consisting of a gas containing oxygen, as described above, and steam is circulated, for a subsequent gasification phase;

ii. a second chamber, a gasification chamber, in communication with the first chamber, rotating around its longitudinal axis coinciding with that of the first chamber, in which the further coaxial tube extends for a differentiated and incremental injection of the gas mixture containing oxygen and steam;

iii. a third chamber, a combustion chamber, in communication with the second chamber, into which a gaseous phase is fed, essentially consisting of CO and $H_2$ (synthesis gas), product of the gasification reaction (ii);

iv. a fourth chamber, an inertization chamber, in communication with the third chamber, for the vitrification of the solid residues.

The apparatus proposed envisages that an indirect heating takes place in the drying chamber, by means of at least one radiating tube inside which the fumes of the subsequent combustion chamber flow, and the radiating tube is such as to contain at least one further coaxial tube inside which the gas containing oxygen and vapour for the subsequent gasification is circulated, wherein the injection of the gas containing oxygen and vapour is preferably effected in differentiated and incremental modality from the inlet towards the outlet.

The inertization takes place by means of plasma torches, with least one anodic element and one cathodic element, having a length ranging from 1,000 to 1,200 mm, a nominal power ranging from 100 to 150 kW, positioned at a distance from the bottom of 300 to 400 mm, having an electric arc length ranging from 100 to 150 mm and with a flow-rate of inert gas, for example argon, for the cathodic torch ranging from 20 to 40 l/min and for the anodic torch ranging from 30 to 60 l/min.

According to a preferred embodiment of the apparatus, object of the present invention a cleaning and advance system of the material to be treated, with scraping blades constantly kept in contact with the internal parts of the system by means of at least one elastic thrust element, is also envisaged.

A general description of the present invention has so far been provided. With the help of the figures and examples, a more detailed description will be now provided of its embodiments to allow a better understanding of its objectives, characteristics, advantages and application modes.

Figure 1:
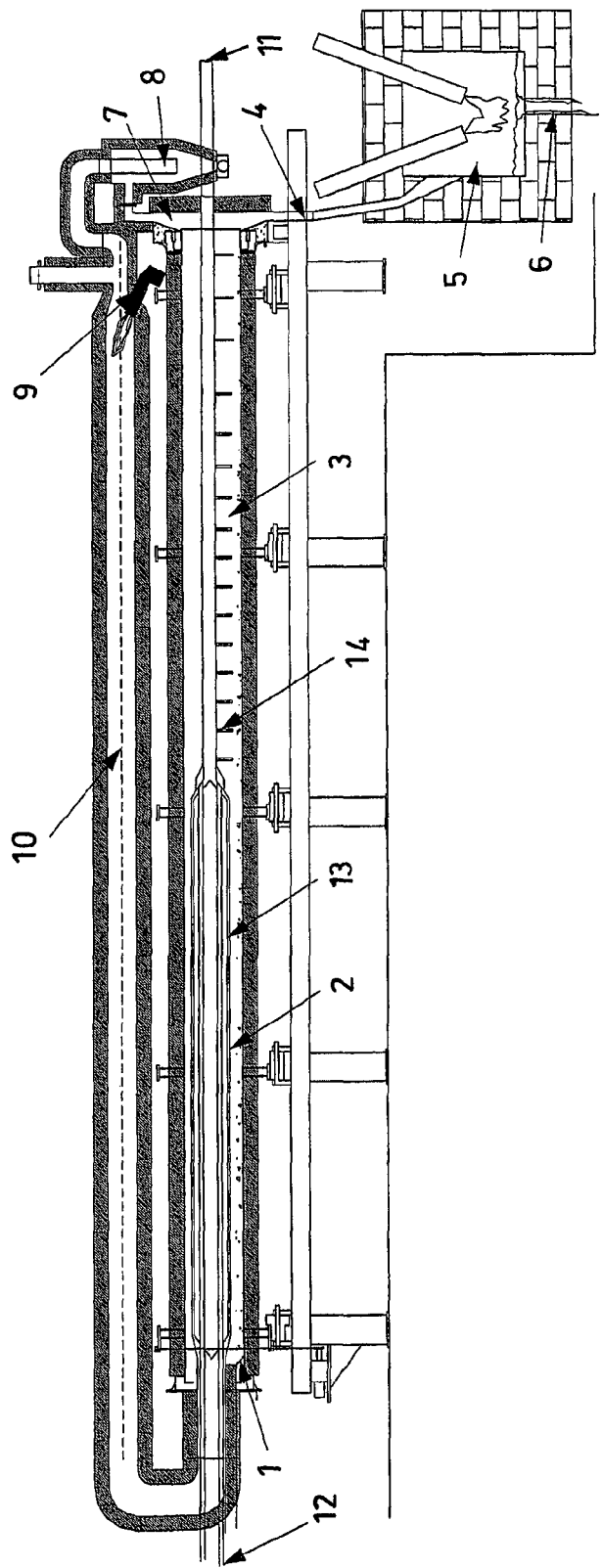
FIG. 1 is a scheme of a longitudinal section of an embodiment of the apparatus according to the present invention.

With reference to FIG. 1, the material to be treated (1) is introduced into the first drying section (2) and advances by means of the rotation and inclination of the chamber, reaching the gasification section (3), coaxial with the first chamber, and subsequently, by means of a duct (4), the inertization section (5) and finally, through the duct (6), it is evacuated into the atmosphere.

The fumes (7) coming from the gasification chamber (3), are sent to a depulverizing filter (8) and then to the combustion chamber (10), wherein they are completely combusted by the action of the burner (9).

The indirect heating (drying) of the sludge takes place in the drying section (2), by means of at least one radiating tube (13) inside which the fumes coming from the subsequent combustion chamber flow, heating the same radiating tube. At least a second tube (14) is positioned coaxially with respect to the radiating tube, in which the line of air and the line of vapor to be used in the gasification section (3), are passed. In the gasification section, the air and vapour, pre-heated inside the radiating tube, are injected into the chamber according to a differentiated modality and increasing the flow-rate from the inlet zone to the outlet zone. In the gasification zone (3), the dried sludge is transformed into ashes. The syngas produced in the gasification section (3) is sent to the combustion section (10) in which said gas is completely burnt and used for heating the radiating tube. The ashes produced in the gasification section (3) are sent to the subsequent ash inertization section (5) effected by means of a plasma furnace.

Figure 2:
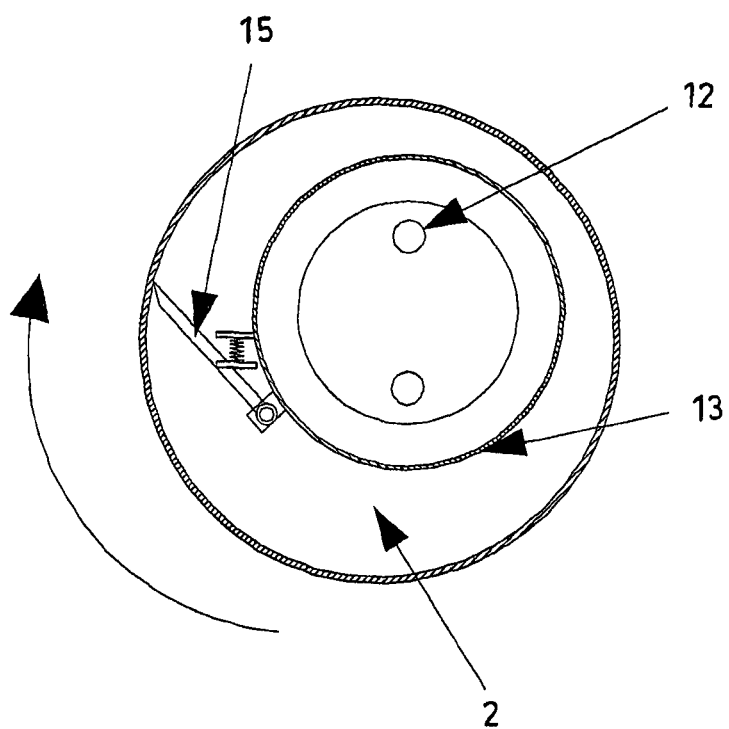
FIG. 2 is a detail of the apparatus and represents a scheme of the advance system according to the invention.

As illustrated in FIG. 2, in order to favour, the correct and constant advancing of the material to be treated, the structure of the apparatus has been developed with the insertion in its interior of a cleaning and advance system with scraping blades (15) kept constantly in contact, by means of at least one elastic element, for example with the internal wall of the chamber (2), inside which there is the radiating tube (13) containing the tubes (12) for the entrance of air and/or vapour necessary for the gasification.

The process according to the present invention is now described by some applicative and non-limiting examples.

EXAMPLES

The embodiment examples relate to: a) the treatment of a mixture of biological and oil sludge; b) the treatment of oil sludge; c) the treatment of biological sludge and pet-coke, added in a minimum percentage to thermally self-sustain the process.

(a) Treatment of a mixture of biological and oil sludge the characterization of which is reported in Table 1 below, whereas Table 2 indicates the relative composition of the ashes.

TABLE 1

Analysis of the biological and oil sludge mixture

| composition | Biological and oil sludge mixture as such |
|---|---|
| Total Solids (%) | 46.08 |
| Volatile Solids (%) | 36.25 |
| Inert Solids (Ashes) (%) | 9.83 |
| $H_2O$ (%) | 53.92 |
| TOT (%) | 100 |
| PCS (kcal/kg) | 2703 |
| PCS (kcal/kgSS) | 5841 |
| PCI (kcal/kg) | 2383 |
| PCI (kcal/kgSS) | 5106 |
| PCI (MJ/kg) | 9.98 |
| PCI (MJ/kgSS) | 21.4 |

TABLE 2

Analysis of the ashes of the biological and oil sludge mixture

| Oxides | Biological and oil sludge mixture Value (%) |
|---|---|
| Na2O | 3.50 |
| Al2O3 | 6.70 |
| SiO2 | 22.40 |
| P2O5 | 1.30 |
| CaO | 23.00 |
| TiO2 | 0.40 |
| Fe2O3 | 40.80 |
| SrO | 0.10 |
| CuO | 0.05 |
| NiO | 0.20 |
| V2O5 | 0.30 |
| SeO2 | 0.61 |
| MoO3 | 0.10 |
| K2O | 0.35 |
| As2O3 | 0.19 |
| TOT | 100.00 |

50 kg/h of sludge were introduced into the drying section, and 22 kg/h of dried sludge left this section, sent to the gasification section, together with 345 Nm³/h of fumes at 620° C., which are subsequently sent to the fume treatment section, and 28 kg/h of vapours at 110° C. The dried sludge is sent to the gasifier, into which air is sent for the treatment and from which 4.9 kg/h of ashes are discharged and sent to the inertization section to obtain a vitrified solid residue, and 85 Nm³/h of syngas at 850° C. sent to the burner.

The syngas is then sent to the burner together with 210 Nm³/h of air. 308 Nm³/h of fumes at 910° C. are taken from the burner, also reached by the vapours of the drier, which, after possible treatment in a powder reduction cyclone, are sent to the drying section.

Table 3 below indicates the main process parameters used and the flow-rates of material at the inlet and outlet.

TABLE 3

| | T (° C.) | t (min) | P (mmH₂O) | $W_{solid}$ (Kg/h) | $W_{gas}$ (Nm³/h) | R |
|---|---|---|---|---|---|---|
| Drying | 120 | 40 | −15 | 50 | 28 | — |
| Gasification | 850 | 30 | −15 | 22 | 85 | 0.4 |
| Combustion | 910 | 0.05 | −15 | | 308 | 1.8 |
| Ashes Inertization | 1400 | 20 | −15 | 5 | 30 | |

$W_{solid}$ = Solid flow-rate;
$W_{gas}$ = Gas flow-rate;
R = Comburent/Fuel Stoichiometric Ratio (b) Oil sludge treatment

TABLE 4

Analysis of "Oil sludge"

| composition | Oil sludge as such |
|---|---|
| Total Solid (%) | 65.72 |
| Volatile Solids (%) | 45.58 |
| Inert Solids (Ashes) (%) | 20.14 |
| H₂O (%) | 34.28 |
| TOT (%) | 100 |
| PCS(kcal/kg) | 3030 |

TABLE 4-continued

Analysis of "Oil sludge"

| composition | Oil sludge as such |
|---|---|
| PCS(kcal/kgSS) | 4695 |
| PCI (kcal/kg) | 2724 |
| PCI (kcal/kgSS) | 4495 |
| PCI (MJ/kg) | 11.4 |
| PCI (MJ/kgSS) | 18.82 |

TABLE 5

Analysis of "Oil sludge" ashes

| Oxides | Oil Sludge Value (%) |
|---|---|
| NiO | 0.2 |
| V₂O₃ | 0.39 |
| Na₂O | 2.18 |
| K₂O | 0.51 |
| TiO₂ | 0.1 |
| Fe₂O₃ | 67.73 |
| CoO | 0.05 |
| CuO | 0.11 |
| As₂O₃ | 0.28 |
| MoO₃ | 0.12 |
| La₂O₃ | 0.44 |
| Al₂O₃ | 7.81 |
| MnO | 0.14 |
| MgO | 3.73 |
| Cr₂O₃ | 0.1 |
| CaO | 9.48 |
| SiO₂ | 6.15 |
| BaO | 0.37 |
| SrO | 0.11 |
| TOT | 100 |

50 kg/h of sludge were introduced into the drying section, and 32 kg/h of dried sludge left this section, sent to the gasification section, together with 417 Nm³/h of fumes at 680° C., which are subsequently sent to the fume treatment section, and 18 kg/h of vapours at 110° C. The dried sludge is sent to the gasifier, into which air is sent for the treatment and from which 5.6 kg/h of ashes are discharged and sent to the inertization section to obtain a vitrified solid residue, and 146 Nm³/h of syngas at 780° C. sent to the burner.

The gaseous products deriving from the drying phase (water and low volatile organic substances) together with the gasification products (syngas) are sent to a depulverizing cyclone (8) and subsequently to a combustion chamber (10) where the syngas is combusted by the burner (9) together with 286 Nm³/h of air. The fumes coming from the combustion chamber are sent inside the radiating tube 13 heating it, and exit from the duct 11. The air and vapour are preheated via the ducts 12 situated inside the radiating tube 13 and sent by means of nozzles positioned on the tube 14 in the gasification chamber 3.

417 Nm³/h of fumes at 880° C. are taken from the burner, also reached by the vapours of the drier, which, after possible treatment in a powder reduction cyclone, are sent to the drying section.

Table 6 below indicates the main process parameters used and the flow-rates of material at the inlet and outlet.

TABLE 6

|  | T (° C.) | t (min) | P (mmH$_2$O) | W$_{solid}$ (Kg/h) | W$_{gas}$ (Nm3/h) | R |
|---|---|---|---|---|---|---|
| Drying | 120 | 40 | −15 | 50 | 18 | — |
| Gasification | 780 | 30 | −15 | 32 | 146 | 0.4 |
| Combustion | 880 | 0.04 | −15 |  | 417 | 1.6 |
| Inertization ashes | 1400 | 20 | −15 | 6 | 30 |  |

(c) Biological sludge plus coke

TABLE 7

| Analysis of Biological sludge and Coke | | |
|---|---|---|
| composition | Biological Sludge as such | Coke as such |
| Total Solids (%) | 19.25 | 87.79 |
| Volatile Solids (%) | 13.34 | 82.67 |
| Inert Solids (Ashes) (%) | 5.91 | 5.12 |
| H$_2$O (%) | 80.75 | 12.21 |
| TOT (%) | 100 | 100 |
| PCS(kcal/kg) | 4500 | 7200 |

50 kg/h of sludge were introduced into the drying section, and 17 kg/h of dried sludge left this section, sent to the gasification section, together with 281 Nm$^3$/h of fumes at 570° C., which are subsequently sent to the fume treatment section, and 33 kg/h of vapours at 110° C. The dried sludge is sent to the gasifier, into which air is sent for the treatment and from which 2.9 kg/h of ashes are discharged and sent to the inertization section to obtain a vitrified solid residue, and 79 Nm$^3$/h of syngas at 850° C. sent to the burner.

The syngas is then sent to the burner together with 171 Nm$^3$/h of air. 281 Nm$^3$/h of fumes at 900° C. are taken from the burner, also reached by the vapours of the drier, which, after possible treatment in a powder reduction cyclone, are sent to the drying section.

Table 8 below indicates the main process parameters used and the flow-rates of material at the inlet and outlet

TABLE 8

|  | T (° C.) | t (min) | P (mmH$_2$O) | W$_{solid}$ (Kg/h) | W$_{gas}$ (Nm3/h) | R |
|---|---|---|---|---|---|---|
| Drying | 120 | 60 | −15 | 50 | 33 | — |
| Gasification | 850 | 50 | −15 | 17 | 80 | 0.4 |
| Combustion | 900 | 0.07 | −15 |  | 28 | 1.6 |
| Inertization ashes | 1300 | 10 | −15 | 3 | 20 |  |

With respect to the inertization plant of the ashes (residual and volatile) two torches were used, one anodic and one cathodic, having a length of 1,100 mm and a nominal power of 130 kW, positioned at a distance from the bottom of the inertization furnace of 350 mm, the length of the electric arc was 120 mm, the argon flow-rate for the cathodic torch was 30 l/min and for the anodic torch 40 l/min.

The invention claimed is:

1. A process for thermally treating a refinery sludge, comprising:
   a. drying or pre-heating the refinery sludge at a temperature of from 110 to 120° C., to obtain a dried sludge;
   b. gasifying the dried sludge at a temperature of from 750 to 950° C. for from 30 to 60 minutes, in the presence of a gas comprising oxygen and water vapor, to obtain a synthesis gas comprising CO and H$_2$, and a solid residue;
   c. combusting the synthesis gas at a temperature of from 850 to 1,200° C. to obtain a combustion product and recycling the combustion product to the drying and the gasifying; and
   d. vitrifying the solid residue with a plasma torch, at a temperature of from 1,300 to 1,500° C., thereby making the solid residue inert.

2. The process of claim 1, wherein a pressure of the process is from 100 to 300 Pa.

3. The process of claim 1, wherein a content of pet-coke in the refinery sludge is up to 25% by weight.

4. The process of claim 1, wherein the gas comprising oxygen and water vapor is fed with an incremental differentiated modality.

5. The process of claim 1, wherein a duration of the drying or pre-heating is from 30 to 60 minutes.

6. The process of claim 1, wherein the gas comprising oxygen and water vapor comprises a gas consisting of substantially pure oxygen, air, or air enriched in oxygen.

7. The process of claim 1,
   wherein a duration of the vitrifying is from 30 to 60 minutes, and
   a nominal power of the plasma torch is from 100 to 150 kW.

8. The process of claim 1, wherein the refinery sludge comprises pet-coke.

9. The process of claim 6, wherein the gas consisting of substantially pure oxygen, air, or air enriched in oxygen consists of air enriched in oxygen, having an oxygen content of up to 50% by volume.

10. An apparatus for thermally treating a refinery sludge, comprising:
   i. a first chamber, which is a tilted drying chamber, capable of rotating around a tilted longitudinal axis, tilted with respect to horizontal, and comprising an internal radiating tube configured to contain a flow of fumes coming from a combustion chamber, the radiating tube comprising a further coaxial tube configured to circulate a gas mixture comprising oxygen and steam for a subsequent gasification;
   ii. a second chamber, which is a gasification chamber, in communication with the first chamber, capable of rotating around the tilted longitudinal axis, in which the further coaxial tube extends and in which the further coaxial tube is configured to inject, in a differentiated and incremental injection, the gas mixture;
   iii. a third chamber, which is the combustion chamber, in communication with the second chamber, configured to receive a gaseous phase comprising CO and H$_2$ that is a product of gasification in the second chamber;
   iv. a fourth chamber, which is an inertization chamber, in communication with the third chamber, configured to vitrify a solid residue.

11. The apparatus of claim 10, wherein the second chamber is an elongated chamber configured to maintain a temperature therein.

12. The apparatus of claim 10,
   wherein the inertization chamber further comprises at least two plasma torches, comprising an anodic plasma torch and a cathodic plasma torch,
   each plasma torch of the at least two plasma torches independently has a length of from 1,000 to 1,200 mm, a nominal power of from 100 to 150 kW, a distance of 300 to 400 mm from the bottom of the inertization chamber, and an electric arc length from 100 to 150 mm.

13. The apparatus of claim 10, comprising an internal cleaning and advance system, which comprises a scraping blade and an elastic element,
   wherein the elastic element is configured to constantly keep the scraping blade in contact with an internal part of the drying chamber.

\* \* \* \* \*